(No Model.)

A. W. PACKER.
HOSE JACKET.

No. 332,163. Patented Dec. 8, 1885.

WITNESSES

INVENTOR
A. W. Packer
By F. C. Lowthorp Jr.
his Attorney

United States Patent Office.

ALFRED W. PACKER, OF TRENTON, NEW JERSEY.

HOSE-JACKET.

SPECIFICATION forming part of Letters Patent No. 332,163, dated December 8, 1885.

Application filed June 19, 1885. Serial No. 169,221. (No model.)

*To all whom it may concern:*

Be it known that I, ALFRED W. PACKER, of the city of Trenton, county of Mercer, and State of New Jersey, have invented certain new and useful Improvements in Hose-Jackets, of which the following is a full, clear, and exact description, reference being had to the accompanying drawings, forming a part hereof.

It is a common practice in case of fires, especially those occurring in the upper parts of high buildings, to conduct the hose from the engine up through the various passages, rooms, and stairways of the same or of adjoining buildings to enable the firemen to obtain a better position for playing upon the fire. In such instances damage almost invariably ensues in the building wherein the hose is located by reason of the escape of water during its passage through the same. Frequently the couplings are imperfect. Sometimes the hose is partly worn; and, again, the hose is of inferior quality and liable to burst when the pressure within the hose is increased. In all these cases sudden and oftentimes considerable leaks occur, causing great inconvenience and loss.

I am aware that various contrivances have been employed for the purpose of temporarily repairing any portion of the hose which may thus have happened to break or burst. These, while of various kinds, are alike in gripping firmly the broken portion of the hose, acting merely as a patch over the rent. Moreover, they are only used after the hose has burst or otherwise sprung a leak and a large portion of the damage by flooding is already done; neither do they prevent injury arising from small leakages or from escape of water at the couplings.

My invention, which is designed to guard against the escape of water from the hose into the building through which it is conducted, whatever accidents may happen to the hose-fabric, is of essentially different character.

It consists, broadly, in a water-tight jacket adapted to be readily adjusted around the hose, leaving an intermediate space of annular form, by means of which any waste water from the hose-coupling joints, leaks, &c., is conducted to the exterior of the building.

The jacket, as will be hereinafter more fully described, is made either in one piece or in sections of any convenient length, united together in sufficient number to form a continuous outer casing, which, fitting loosely around the hose, extends from near the hose-nozzle to the outside of the building.

Figure 1:
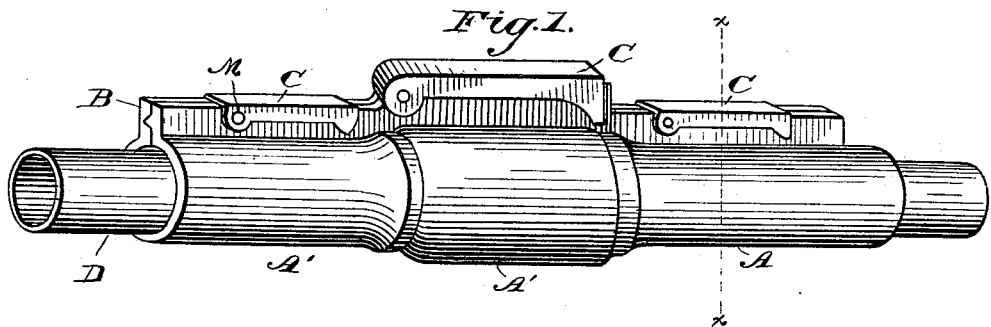
Figure 2:
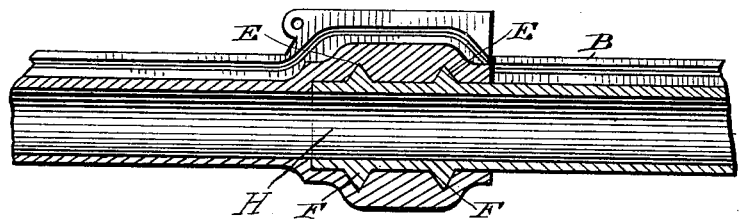
Figure 3:
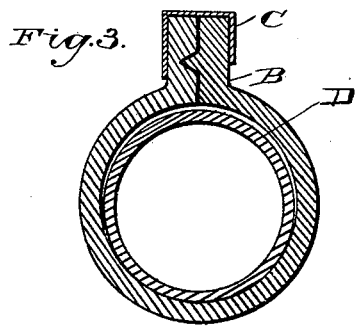
Figure 4:
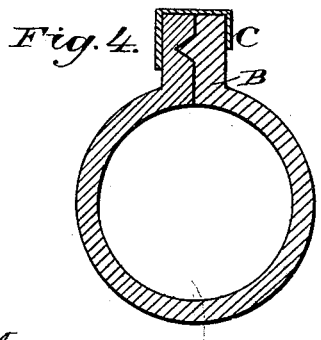
Figure 5:
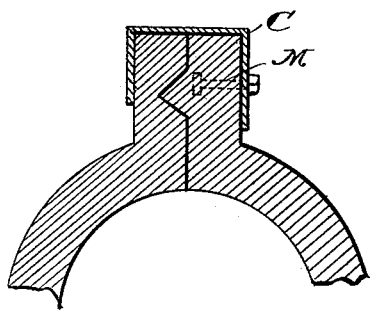

Referring to the accompanying drawings, illustrative of my invention, wherein like letters designate like parts throughout the several views, Figure 1 represents a side elevation of my invention, illustrating a portion of the same of my preferred form of construction. Fig. 2 represents a central section of the same through the section-coupling. Fig. 3 is a cross-sectional view taken upon the line *x x*, Fig. 1. Fig. 4 is a like view omitting the interior hose-pipe. Fig. 5 is a like view to Fig. 4, partly broken away, illustrating the pivot-pin for the binding-clamp.

A A indicate the jacket-sections, and A' the coupling-joint between them. Each section is provided with the longitudinally-divided flange B, one part of which has a longitudinal groove and the other a corresponding ridge projection adapted to fit closely within the groove and render the longitudinal joint water-tight. Pivoted to one division of the flange by means of the pins M are the clamps C, adapted to fold down over the flange-divisions and hold the same closely together.

D indicates a portion of the hose lying within the hose-jacket. To couple the hose-jacket sections in a water-tight manner, I provide one end of each section with two interior recesses, forming annular grooves E. The proximate end of the adjoining section is provided with corresponding annular lugs or projections, F, the grooves and lugs forming the constituent parts of a male and female joint. One of the ends forming the coupling is enlarged, as shown, for the admission of the other; and it will be noticed that the lugs are slightly larger than the grooves within which they fit. The material of which the jacket is constructed being of india-rubber or like flexible material, this arrangement enables me to secure a very tight joint.

The mode of operation of my invention is as follows: The enlarged end of the section A being laid open, the smaller end, H, of the next section is laid therein, the annular grooves of the one and lugs of the other being in juxtaposition. The hose is then placed within the sections and the longitudinal flange brought together and secured by pressing down the clamps C. In this manner the hose is inclosed within continuous sections of the jacket, reaching from the nozzle of the hose to the exterior of the building, and an uninterrupted passage-way is provided for the waste water between the hose and jacket to the ground.

Having thus described my invention, what I claim, and desire to secure by Letters Patent, is—

1. The combination, with a fire-hose, of a flexible jacket loosely encircling the same, the internal diameter of the jacket being greater than the external diameter of the hose throughout their whole extent, whereby a free passage is left between the hose and jacket for conducting off leakage from the hose, substantially as described and shown.

2. The combination, with a fire-hose, of a flexible jacket loosely inclosing the same and composed of separate detachable sections, substantially as described and shown.

3. A hose-jacket of the kind described, consisting of a longitudinally-divided flexible pipe and similarly-divided projecting flange, the pipe being composed of sections detachable one from the other, and clamps for uniting the divided flange and the section ends, substantially as described and shown.

4. A hose-jacket of the kind described, composed of detachable sections, one end of each section being enlarged and provided with annular grooves and the proximate end of the adjoining section being provided with corresponding annular ribs or flanges and a clamp for joining the said ends, substantially as described and shown.

ALFRED W. PACKER.

Witnesses:
WILLIAM S. MILLS,
S. T. BEATTY.